Figure 1:
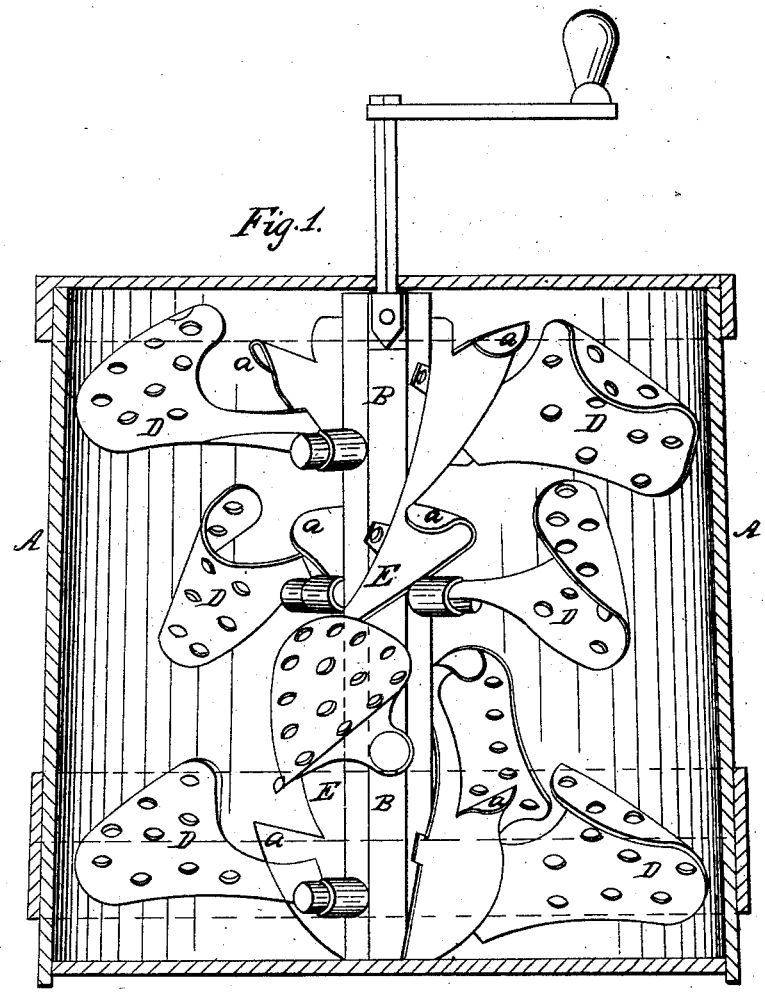

J. J. WATSON.
Churn.

No. 30,438.

Patented Oct. 16, 1860.

Witnesses:
C M Alexander
A A Yeatman

Inventor:
John J. Watson

UNITED STATES PATENT OFFICE.

JOHN J. WATSON, OF BUFFALO, NEW YORK.

CHURN-DASHER.

Specification of Letters Patent No. 30,438, dated October 16, 1860.

*To all whom it may concern:*

Be it known that I, JOHN J. WATSON, of Buffalo, in the county of Erie and State of New York, have invented certain new and useful Improvements in Churns; and I do hereby declare that the following is a full, clear, and exact description of the same, reference being had to the accompanying drawings and to the letters of reference marked thereon.

The nature of my invention consists in constructing and arranging the dasher in the manner hereinafter described.

In the annexed drawings making a part of this specification A, represents the churn box, which is constructed in any of the known ways, and of any desired size.

B, represents the dasher staff. This staff is provided with a series of dashers, D, D, D, which are made of metal or any other suitable material, and which are curved and shaped in the manner represented in the drawing. The ends of these dashers are turned, and perforated in the manner shown. The object in turning the ends of the dashers is to catch the milk or cream as it is thrown away from the shaft, or from the center of the churn box by the centrifugal action.

The dashers are perforated around the curve, in order to break the globules of cream, as they are thrown violently through said perforations. A portion of the cream is thrown through the perforations and a portion follows the curve of the dasher and is thrown in toward the dasher staff again, at the same time having an upward tendency.

Around the dasher staff is wound a spiral flange, E, upon which are formed auxiliary dashers, *a, a*. These dashers are not perforated but catch the cream as it approaches the shaft with an upward tendency and throw it back toward the bottom of the churn box or toward the large or main dashers below them.

By the arrangement of the main and auxiliary dashers and the spiral flange, the cream is raised and precipitated toward the bottom of the box, and is cut and agitated in such a violent manner that the globules are soon broken, and butter produced.

Having thus fully described my invention what I claim as new and desire to secure by Letters Patent is—

The arrangement of the main dashers, D, D, with the auxiliary dashers, *a a* and the spiral flange E, when the same are used as and for the purpose herein specified.

JOHN J. WATSON.

Witnesses:
C. M. ALEXANDER,
A. A. YEATMAN.